April 10, 1956  H. B. GROW  2,741,289
THREADED FASTENER HAVING DEFORMABLE LOCKING
FLANGE WITH BITING TEETH
Filed Sept. 25, 1952
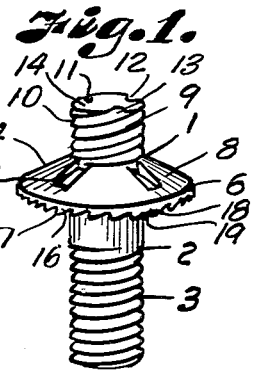
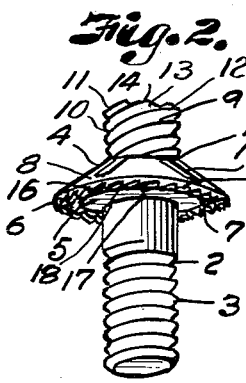
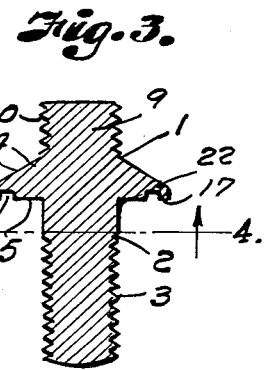
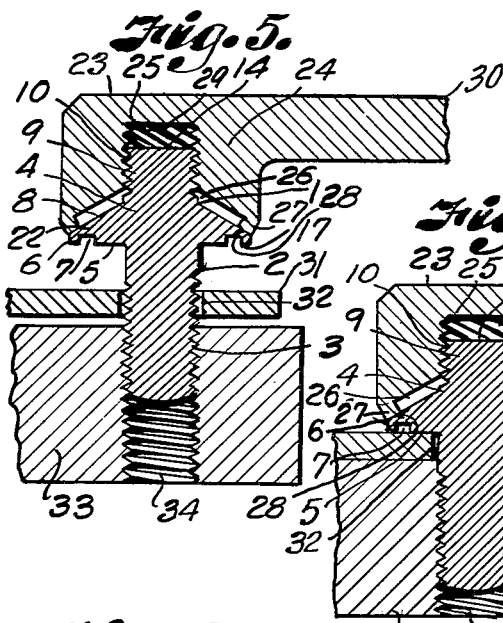
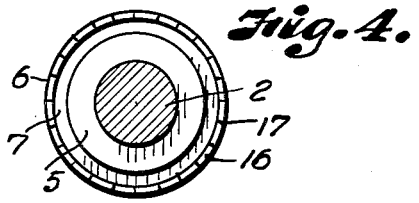
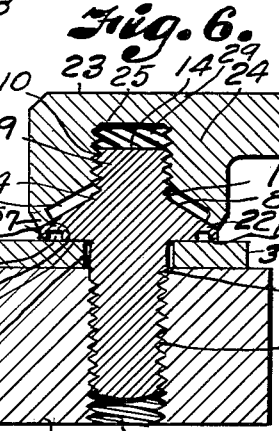
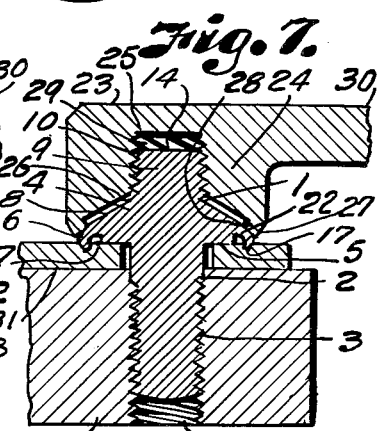
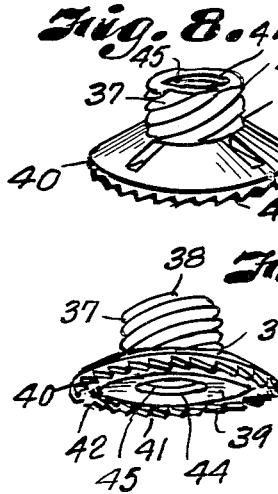
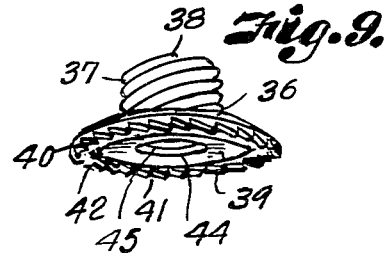
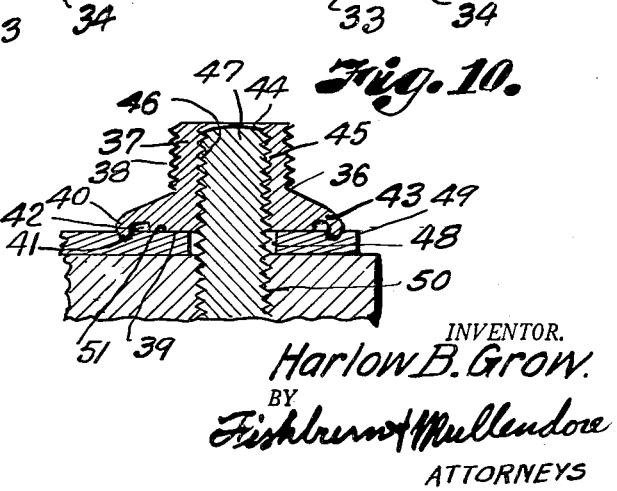
INVENTOR.
Harlow B. Grow.
BY
Fishburn & Mullendore
ATTORNEYS

United States Patent Office 2,741,289
Patented Apr. 10, 1956

2,741,289

THREADED FASTENER HAVING DEFORMABLE LOCKING FLANGE WITH BITING TEETH

Harlow B. Grow, Linden, Mo.

Application September 25, 1952, Serial No. 311,485

4 Claims. (Cl. 151—37)

This invention relates to fastening devices of the self-locking type and has for its principal object to provide a device of this character which is adapted to be tightened to a predetermined degree and then automatically locked without producing greater stresses in the fastening device or parts connected thereby.

A further object of the invention is to provide a fastening device with a wrench engaging head having a deformable locking flange which is engaged by the wrench and a stop, whereby the locking flange is set by further movement of the wrench after turning movement of the fastening device has been arrested upon engagement of the stop.

Another object is to provide a fastening device with a locking means in cooperation with a wrench which tightens the fastening device through mechanical engagement therewith and then sets the locking means when the resistance to rotation of the fastening device becomes greater than the forces required to set the locking means.

Another object of the invention is to provide a self-locking fastening device with teeth that are set by pressing the teeth directly into the surface of the metal so that the engaged surface has dents corresponding with the shape of the teeth on the locking flange.

A further object of the invention is to provide a self-locking fastening device that may be removed when desired.

In accomplishing these and other objects of the invention hereinafter pointed out, I have provided improved structure, the preferred forms of which are illustrated in the accompanying drawing wherein:

Fig. 1 is a perspective view of a machine screw embodying the features of the present invention.

Fig. 2 is a similar view from a different angle to better illustrate the stop and teeth of the locking flange.

Fig. 3 is a longitudinal axial section through the fastening device.

Fig. 4 is a cross section through the machine screw taken on the line 4—4 of Fig. 3.

Fig. 5 is a sectional view of the fastening device and wrench used in turning the screw into position for securing one member to another, the wrench and members also being shown in section.

Fig. 6 is a similar view showing the stop on the head in contact and the members drawn together.

Fig. 7 is a similar view after the wrench has deformed the locking flange and the teeth set into the metal of the member to be secured.

Fig. 8 is a perspective view of a nut embodying the features of the present invention.

Fig. 9 is a perspective view of the nut from a different angle.

Fig. 10 is a vertical section showing the nut as used on a stud bolt.

Referring more in detail to the drawings:

While my invention is adapted to various types of screws, bolts, nuts and similar threaded fastening devices, I have illustrated the invention as applied in a machine screw 1 which includes a shank 2 having external threads 3 and a head 4 by which the shank is turned to engage the threads 3 within the threads of a part in which the screw is to be used. The head 4 is of larger diameter than the shank 2 to provide a circumferential stop shoulder 5 and an encircling flange 6 that is spaced outwardly from the shoulder 5 by an annular groove 7. The opposite side of the head preferably has a cone-shaped periphery 8 encircling a wrench engaging portion 9 that is coaxial with the shank 2 and provided with annular threads 10. The threads 10 are of relatively steep pitch and preferably consist of a plurality of leads as indicated at 11, 12, and 13 to give a rapid application and back off of the wrench and yet provide sufficient thread contact with the wrench as later described.

The multiple leads or threads illustrated start from the end face 14 and terminate at the juncture of the threaded portion 10 with the inclined face 8 as shown in Fig. 1. The face 8 is preferably provided with a plurality of radially arranged recesses or slots 15 which are adapted to be engaged by a spanner wrench of standard type when the cap screw is to be removed after use.

Formed in the flange 6 is a circular series of teeth or projections 16 having points 17 in directions parallel with the axis of the shank and having front and rear faces 18 and 19. The points of the teeth 17 preferably terminate short of the plane of the stop shoulder 5 whereby engagement of the stop shoulder effects tightening of the screw prior to the engagement of the points of the teeth. The front and rear faces 18 and 19 of the teeth are preferably inclined to facilitate penetration of the points of the teeth, and the faces 19 on the rear or retractive side of the teeth are preferably at a less angle to provide a cam surface in facilitating reshaping of the deformable flange when the screw is to be removed.

The groove 7 and face 8 provide therebetween a relatively thin annular portion 22 which connects the locking flange 6 with the body portion of the screw head and whereon the flange is deformed or bent as later described.

The machine screw is applied by means of a wrench 23 having a head 24 that has an internally threaded socket 25 conforming with the threads of the head portion 10 and which is encircled by a conical recess 26 substantially conforming to the conical portion 10 as shown in Fig. 5. The wrench head also includes an annular rib or flange 27 that encircles the recess 26 and has an annular face 28 adapted to bear frictionally upon the rim of the portion 22 of the head at a point substantially in direct alignment with the teeth or projections 16 when the wrench is engaged with the threaded portion of the head as shown in Fig. 5. When thus engaged, a space 29 is provided above the threaded portion 9 of the head so that the wrench may turn relatively to the head of the screw after the stop shoulder 5 has engaged to arrest further rotation of the screw when the machine screw is to used as later described.

The cap screws as above described is made from a material having tensile strength to carry the desired load and to provide a flange portion for the head that is deformable under movement of the wrench on the threads of the head portion 9 to project the teeth 16. If desired the cap or machine screw may be suitably heat treated to provide the desired strength and to provide the flange portion that is readily deformable when the screw is used.

The wrench 24 may be operated by any means but is here shown as provided with a radial handle 30 that may be manually manipulated.

In using the machine or cap screw, for example, to attach a plate member 31 having an opening 32 to an attaching member 33 having an internally threaded socket 34, the shank of the screw is extended through the opening 32 in the plate member 31 and turned into the threaded socket 34 to engage the threads. The wrench is then applied to the threads of the head portion 10 of the screw and turned thereon until the annular rib 27 engages the face 8 of the screw head. Then when the wrench is rotated the mechanical engagement between the wrench and the screw head drives the cap screw to turn the screw shank into the socket until the stop shoulder or face 5 is in contact with the upper surface 35 of the plate member 31.

It is obvious that mechanical driving contact is maintained by the threaded engagement of the wrench head with the head portion 10 of the screw and resistance to rotation of the screw by the wrench tends to increase the torsional forces transmitted between the wrench and screw head. Rotation of the cap screw now moves the plate member into contact with the member to which it is to be attached. Up to this point, the tensile strengh of the metal in the rim portion of the head is sufficient to support the locking rim against thrust of the wrench as effected by the threads on the head portion 10 of the screw; but as rotation of the screw becomes arrested on tightening of the screw against the plate member, the thrust effected by the threads of the wrench and head portion 10 of the screw exceeds the yield point on the metal composing the locking flange, and continued movement of the wrench causes the locking rim to yield under pressure of the wrench and to bend so that the teeth penetrate the surface of the plate member 2 thereby locking the cap screw.

The locking rim having been bent beyond the elastic limit of the metal retains its engagement with the plate member 31 after the wrench is removed. The wrench is readily removed from the threaded portion 10 of the head by rotating the wrench in reverse direction.

It is obvious that a fastening means can be made to be automatically tightened to any desired degree by forming the locking flange so that it yields after the predetermined pressure is reached and the wrench moves on the threads of the screw head to set the locking flange at that pressure.

Figs. 8, 9 and 10 show the invention adapted to a nut 36 which may be used in connection with a bolt or stud as illustrated in Fig. 10. In this form of the invention, the nut includes an externally threaded portion 37 having threads 38 similar to the threads of the first described form of the invention. The nut also includes an annular disc-like portion having a stop face or shoulder 39 and an outwardly spaced annular flange 40 that is provided with teeth 41 similar to the teeth in the first described form of the invention, the flange 40 and shoulder 39 being spaced apart by an annular recess 42 to provide the relatively thin bendable rim portion 43 as in the first form of the invention.

The nut 36 has an axial bore 44 that is provided with threads 45 which are adapted to engage the threads 46 of a stud 47. In this form of the invention, the stud is passed through an opening 48 of the member 49 to be secured and engaged with the threads of the socket 50. The nut 36 is then applied and engaged with the socket wrench similar to the wrench previously described. The nut is tightened until the stop shoulder or face 39 engages the upper face 51 of the member 49 to resist rotation, after which the wrench turns on the threaded portion 37 of the nut so that the annular rim bends and sinks the toothed portion of the flange 40 into the member 49.

In removing the machine screw or the nut as illustrated, a spanner wrench of proper shape is inserted in the slots 15 and the wrench rotated in a direction to back off the nut or screw as the case may be. Since the longer faces 19 of the teeth are then in direction of rotation, they act as cams to bend the flange to its original shape thereby freeing the nut or machine screw as the case may be.

From the foregoing it is obvious that the characteristic features are that the teeth are engaged with a parallel motion of the bending of the locking flange after rotation of the fastening device has been arrested and that by predesign the action of the locking flange will be effected to sink the teeth at a predetermined stress force to which the fastening device can be turned. Thus the fastening device functions as an automatic torque wrench and when a plurality of fastening devices are used in securing one member to another, each fastening device will automatically be tightened to the same degree as the others thereby assuring that each fastening device will carry its proportional share of the design load.

What I claim and desire to secure by Letters Patent is:

1. A self-locking fastening device adapted to be applied and locked by a single wrench having a head provided with an annular driving face and a cam thread extending in the direction of the driving face, said fastening device having a body portion provided with threads and a stop face for applying a predetermined tightening pressure on a part to be secured by the fastening device, a wrench engaging portion on the fastening device having a cam thread extending in the direction of the thread of said body portion and adapted to be engaged by the cam thread on the wrench when the wrench is turned onto said wrench engaging portion, a flange extending laterally from the wrench engaging portion at the base of the cam thread and having a marginal driving face projecting radially beyond said stop face and engageable by the driving face of the wrench under action of said cam thread to effect a driving connection between the wrench and the fastening device for turning the fastening device to bring said stop face thereof into contact with said part to be secured by the fastening device, said flange having teeth on the side of the flange having the stop face and in substantial registry with the marginal driving face, said flange being of less thickness at a point between the teeth and the stop face and defining a definite point of yield under the rotative driving force of the wrench applied upon said marginal face under action of the cam thread to press the teeth into the part to be secured when the predetermined tightening pressure has been reached.

2. A self-locking fastening device adapted to be applied and locked by a single wrench having a head provided with an annular driving face and a cam thread extending in the direction of the driving face, said fastening device having a body portion provided with threads and an annular stop face for applying a predetermined tightening pressure on a part to be secured by the fastening device, a wrench engaging portion on the fastening device having a cam thread extending in the direction of the thread on said body portion and adapted to be engaged by the cam thread of the wrench when the wrench is turned onto said wrench engaging portion, a lateral flange encircling the wrench engaging portion and having a marginal driving face projecting radially beyond said stop face and engageable by the driving face of the wrench under action of said cam thread to effect driving connection between the wrench and the fastening device for turning the fastening device to bring said stop face thereof into contact with said part to be secured by the fastening device, said flange having teeth on the side of the flange having the stop face and spaced outwardly therefrom about the entire periphery of the flange and in substantial registry with the marginal driving face, said flange having an annular groove between the teeth and the stop face and defining a definite point of yield completely around said stop face under the rotative driving force of the wrench applied upon said marginal face under action of the cam thread to press the teeth into the part to be secured when the predetermined tightening pressure has been reached.

3. A self-locking fastening device adapted to be applied and locked by a single wrench having a head provided with an annular driving face and a cam thread extending in the direction of the driving face, said fastening device including a threaded shank a head on said shank and forming a stop shoulder encircling the shank for applying a predetermined tightening pressure on a part to be secured by the fastening device, a lug on said head of the fastening device in coaxial relation with the threaded shank and having a cam thread extending in the direction of the thread on said shank and adapted to be engaged by the cam thread of the wrench when the wrench is turned onto said lug, a flange encircling said head of the fastening device and having a marginal driving face projecting circumferentially beyond said stop shoulder and engageable by the driving face of the wrench under action of said cam thread to effect driving connection between the wrench and the fastening device for turning the fastening device to bring said stop shoulder thereof into contact with said part to be secured by the fastening device, said flange having teeth on the side of the flange having the stop shoulder and spaced therefrom about the entire periphery of the stop shoulder and in substantial registry with the marginal driving face, said flange having an annular groove completely encircling the stop face on the inner side of said teeth to form definite point of yield under the rotative driving force of the wrench applied upon said marginal face under action of the cam thread on the lug to press the teeth into the part to be secured when the predetermined tightening pressure has been applied.

4. A self-locking fastening device adapted to be applied and locked by a single wrench having a head provided with an annular driving face and a cam thread extending in the direction of the driving face, said fastening device having a body portion provided with internal threads and annular stop face for applying a predetermined tightening pressure on a part to be secured by the fastening device, a wrench engaging lug coaxial with said body portion and having a cam thread extending in the direction of the thread on said body portion and adapted to be engaged by the cam thread of the wrench when the wrench is turned onto said wrench engaging lug, a flange encircling said lug and having a marginal driving face projecting radially beyond said stop face and engageable by the driving face of the wrench under action of said cam thread to effect driving connection between the wrench and the fastening device at the margin of said flange for turning the fastening device to bring said stop face thereof into contact with said part to be secured by the fastening device, said flange having teeth on the side of the flange having the stop face and in substantial registry with the marginal driving face, said flange having a groove completely encircling the stop face and defining a definite point of yield completely around the stop face under the rotative driving force of the wrench applied at said marginal face under action of the cam thread to press the teeth into the part to be secured when the predetermined tightening pressure has been reached, said teeth having sloping faces on sides thereof opposite to said tightening direction to facilitate removal of the fastening device when desired and said flange having recesses adapted to be engaged by a wrench when the fastening device is to be removed.

References Cited in the file of this patent

UNITED STATES PATENTS

| | | |
|---|---|---|
| 1,475,779 | Barnes | Nov. 27, 1923 |
| 1,561,003 | Leloup | Nov. 10, 1925 |
| 1,896,388 | Zeidler | Feb. 7, 1933 |
| 2,226,491 | Gustafson | Dec. 24, 1940 |
| 2,489,919 | Merriman | Nov. 29, 1949 |